(12) United States Patent
Stephens, II

(10) Patent No.: US 6,991,450 B1
(45) Date of Patent: Jan. 31, 2006

(54) OPEN CAVITY EXTRUSION DIES

(75) Inventor: Alan T. Stephens, II, Beaver Dams, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/930,107

(22) Filed: Aug. 31, 2004

(51) Int. Cl.
*B29C 47/12* (2006.01)

(52) U.S. Cl. .................. 425/461; 425/467; 425/462; 425/464; 264/177.12; 264/177.11

(58) Field of Classification Search ............. 425/461, 425/463, 467, 464; 264/177.12, 177.11
See application file for complete search history.

(56) References Cited

U.S. PATENT DOCUMENTS

| | | | |
|---|---|---|---|
| 3,790,654 A | | 2/1974 | Bagley et al. |
| 3,885,977 A | | 5/1975 | Lachman et al. |
| 3,905,743 A | | 9/1975 | Bagley |
| 3,923,444 A | * | 12/1975 | Esper et al. ............. 425/461 |
| 4,118,456 A | * | 10/1978 | Blanding et al. ...... 264/177.12 |
| 4,992,233 A | | 2/1991 | Swaroop et al. |
| 5,011,529 A | | 4/1991 | Hogue et al. |
| 5,066,215 A | | 11/1991 | Peters et al. |
| 5,238,386 A | * | 8/1993 | Cunningham et al. .. 425/192 R |
| 5,702,659 A | * | 12/1997 | Kragle et al. .......... 264/177.11 |
| 5,761,787 A | * | 6/1998 | Kragle et al. ................ 29/418 |
| 6,080,348 A | * | 6/2000 | Shalkey ................. 264/177.12 |
| 6,455,124 B1 | * | 9/2002 | Beall et al. ................. 428/116 |
| 6,558,151 B1 | * | 5/2003 | Kragle ....................... 425/463 |
| 2002/0098320 A1 | * | 7/2002 | Beall et al. ................. 428/116 |
| 2004/0150133 A1 | * | 8/2004 | Bernas et al. .......... 264/177.12 |

FOREIGN PATENT DOCUMENTS

JP 62-236710 10/1987

* cited by examiner

*Primary Examiner*—Robert Davis
*Assistant Examiner*—G. Nagesh Rao
(74) *Attorney, Agent, or Firm*—Kees van der Sterre

(57) ABSTRACT

Honeycomb structures are formed at reduced extrusion pressures and high extrusion rates via extrusion through open cavity honeycomb extrusion dies incorporating large, closely spaced feed channels delivering extrudable material to die honeycomb forming sections incorporating extrudate distribution means in the form of inverted conical or pyramidal flow dividers incorporating inclined flow-guiding surfaces that guide the extrudate into the base ends of plural discharge slot intersections and/or slot segments in direct line with the feed channels.

7 Claims, 2 Drawing Sheets

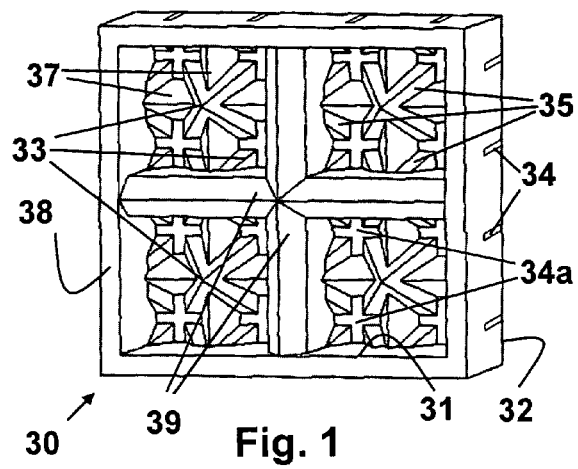
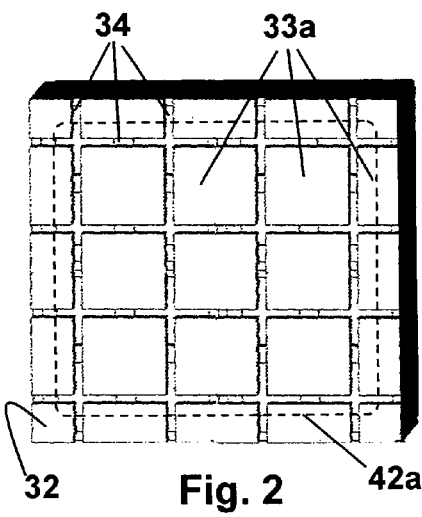
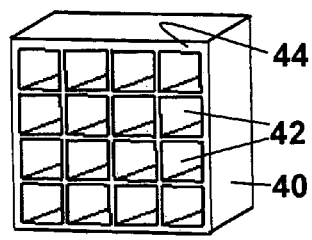
Fig. 1
Fig. 2
Fig. 4
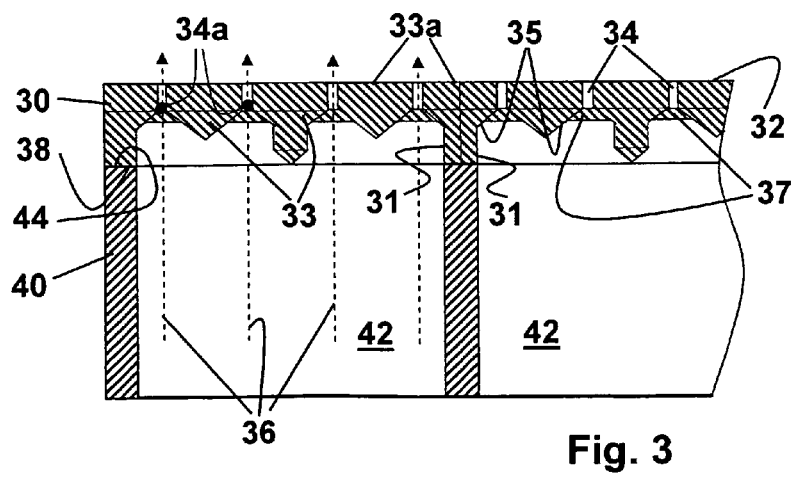
Fig. 3

OPEN CAVITY EXTRUSION DIES

BACKGROUND OF THE INVENTION

The present invention relates to methods and apparatus for forming extrudable materials such as plasticized powder batches or pastes into complex structures, such as honeycombs, by the process of extrusion. More particularly, the invention relates to improvements in extrusion apparatus and extrusion methods that enable the production of cellular structures such as extruded honeycombs from extrudates such as plasticized ceramic or metal powder batches at higher extrusion rates and lower extruder pressures.

The manufacture of inorganic honeycomb structures from plasticized powder batches comprising inorganic powders dispersed in appropriate binders is well known. U.S. Pat. Nos. 3,790,654, 3,885,977, and 3,905,743 describe extrusion dies, processes, and compositions for such manufacture, while U.S. Pat. Nos. 4,992,233 and 5,011,529 describe honeycombs of similar cellular structure extruded from batches incorporating metal powders.

While continually evolving, current commercial honeycomb extrusion die designs do not depart fundamentally from the die designs shown in these early patents, being mostly fabricated by the machining of solid metal blocks or billets. To make such a die, multiple apertures are first drilled into one face of a steel billet to form a feedhole array into which a plasticized batch material to be extruded can be supplied at high pressure. A discharge face for the die is thereafter formed by cutting a criss-crossing array of finely machined discharge slots into the billet face opposite the drilled inlet face, the slots being cut to a depth intersecting the ends of the feed holes extending from the inlet face. Thus plasticized batch material delivered through the feedholes into the intersecting discharge slots is continuously shaped by and discharged from the slots as the interconnecting wall-and-channel structure of an extruded honeycomb.

A number of machining techniques have been adapted for the shaping of metal billets into honeycomb extrusion dies. For softer steels, the feedhole array is typically formed by mechanical drilling and the discharge slots by sawing. If the die is to be formed of harder, slower-wearing materials such as stainless steels, electrochemical machining and electrical discharge machining are more widely used. Generally, however, inlet face designs continue to feature feedholes in the shape of linear cylinders of reasonably constant radius and of a diameter and spacing dictated by the slot spacing or so-called honeycomb cell density of the die.

Of constant concern in the manufacture of ceramic honeycombs by extrusion methods are the high pressures required to force plasticized powder batch materials through these dies. Commercial demand for honeycombs with thinner walls and higher cell densities (more channels per unit of honeycomb cross-section) has required dies with smaller and more closely spaced feed holes and discharge slots, and necessitated the use of higher extruder pressures and thus dies of higher strength.

A number of methods for increasing die rigidity and/or reducing die flow impedance have been proposed to address these problems. Die designs such as the compound feed dies taught in U.S. Pat. No. 4,118,456 can increase die strength and rigidity, but the feedhole and slot flow channels in these dies still present planar surfaces oriented largely transversely to the direction of batch flow through the die. These surfaces tend to increase flow impedance and create flow stagnation points within the dies, the latter acting as sources for agglomerate formation that can lead to clogged passages within the dies and/or regions of batch inhomogeneity caused by the preferential collection of batch constituents such as water, plasticizers, and lubricants at the stagnation points.

Smoother flow profiles are provided in laminated dies such as those disclosed in U.S. Pat. No. 6,558,151 and bonded pin dies such as disclosed in published Japanese Patent Application No. 62-236,710, but at a significantly higher die fabrication cost. Also costly are die designs such as disclosed in U.S. Pat. No. 5,066,215 wherein transverse surfaces along the batch flowpath are completely eliminated. In each of these cases the manufacture of even a single extrusion die is complex and expensive, and thus the maintenance of an inventory of such extrusion dies adequate to support an economic ceramic honeycomb manufacturing operation can be cost prohibitive.

In short, currently available extrusion die designs of sustainable cost continue to present significant problems relating to high pressure drop, problems that are aggravated as higher cell density honeycombs requiring more complex dies and higher extrusion pressures are commercially required.

SUMMARY OF THE INVENTION

The present invention employs a honeycomb extrusion die of improved design and moderate cost that significantly reduces the extruder pressures required for honeycomb extrusion, thereby enabling a honeycomb extrusion process that can be carried out at higher extrusion rates and at reduced manufacturing cost. Improved extrusion performance in accordance with the invention is secured in part by using a die that incorporates large, closely spaced extrudate feed channels (open cavities) capable of directly supplying extrudate to multiple discharge slot segments or intersections, i.e., supplying the extrudate without feed channel angling or branching. These large-channel designs are enabled by an extrusion die forming section of novel configuration that reshapes flowing extrudate into channeled honeycomb structures at high speeds and low backpressures.

In a first aspect, therefore, the invention comprises a honeycomb extrusion die comprising a die body section having a die inlet face and a parallel array of open-ended extrudate feed channels extending from the inlet face toward a honeycomb forming section spaced from the inlet face at the terminations of the feed channels. The forming section terminates at a die outlet face, that outlet face incorporating the customary criss-crossing array of open discharge slots that extend inwardly into the honeycomb forming section toward the feed channels, and that define the array of channel-forming pins terminating at the die outlet face, which pins determine the size and shape of the channels of honeycombs extruded from the dies. The discharge slots extend to and terminate at slot base ends disposed within the forming section which slot base ends are open to the feed channels that deliver flowing extrudate into the honeycomb forming section.

Further features of these dies include extrudate distribution means disposed within each of the extrudate feed channels for guiding extrudable material toward the slot base ends. Such distribution means comprise one or more inverted conical or pyramidal flow dividers extending inwardly from the channel-forming pins toward the feed channels, the dividers including inclined flow-guiding side surfaces inclined toward the feed channels and having base edges terminating at the base ends of the discharge slots into which extrudable material passing through the die is directed. The inclined surfaces of the flow dividers are important in reducing the extrusion pressures needed to deliver the extrudable material into the discharge slots.

Equally important in reducing the flow impedance in these dies is the large size of the feed channels employed in the design. In general, the average cross-sectional area of each feed channel provided in the body section of a die in accordance with the invention is well in excess of twice the average cross-sectional area of the channel-forming pins defined by the discharge slots. Much higher feed-channel-to-pin area ratios are attainable; for example, dies wherein the average feed channel cross-section is more than eight times the average pin cross-section can be successfully designed and used. Further, the spacing of these large feed channels can be close enough that the aggregate feed channel cross-sectional area for a typical die body is in excess of 50% of the cross-sectional area of the channeled section of the die body.

The use of large extrudate feed channels and flow dividers such as described enables die designs featuring direct extrudate flow through single feed channels into multiple intersections of the slot base ends within the honeycomb forming section of the die. For the purposes of the present description direct extrudate flow means straight line-of-sight extrudate flow from a die body inlet through a feed channel into a slot base end, in contrast to extrudate flow distributed to slot segments or base ends only after passage through angled or branched feed channels. The branched or angled feed channels used for extrudate distribution in some prior art dies are known to increase extrudate flow resistance through the dies.

While one-piece die designs incorporating features such as hereinabove described can be produced through casting or layering methods, the same design features can also be secured using more conventional machining methods by employing a two-part die construction. In two-part dies, the die body consists of a so-called cavity plate, i.e., a relatively thick plate incorporating the die inlet face, an opposing bonding surface, and a parallel array of open extrudate feed channels traversing the cavity plate from the inlet face to the bonding surface thereof. Cavity plates typically differ from the drilled plates used for conventional two-part dies in that the feed channels are large and more closely spaced, with the aggregate feed channel cross-sectional area again being in excess of 50% of the cross-sectional area of the channeled portion of the cavity plate.

The second part of these two-part dies consists of a honeycomb forming plate having an attachment face joined to the bonding surface of the cavity plate. Opposing the attachment face of the forming plate is an outlet face for the die incorporating the conventional criss-crossing array of open discharge slots and channel-forming pins, the slots extending into the plate toward the slot base ends disposed within the plate. However, being separately machined, the forming plate additionally includes an array of extrudate transfer openings in the attachment face, these openings constituting extensions of the cavity plate feed channels and providing paths for extrudate flow from the extrudate feed channels in the cavity plate into the slot base ends in the forming plate. For least flow impedance the extrudate transfer openings will preferably be positionally aligned with and substantially equivalent in cross-sectional shape to the feed channels.

Within each of the extrudate transfer openings in the forming plate are extrudate distribution means configured just as in the case of the above-described one-part die. Thus inverted conical or pyramidal flow diverters extending downwardly from the channel-forming pins, with inclined flow-guiding surfaces inclined toward the feed channels and having base edges terminating at the base ends of the discharge slots, are similarly provided.

Like the feed channels in the die body plates of one-piece dies, the feed channels and extrudate transfer openings in the two-part dies have average cross-sectional areas that are in excess of twice the average cross-sectional area of the channel-forming pins defined by the discharge slots, or more than eight times the average pin cross-section in the preferred designs. Thus the feature of direct rather than branched or angled extrudate flow through single feed channels and connecting transfer openings into multiple intersections of the slot base ends within the honeycomb forming section of the die is retained.

One of the primary advantages of die designs such as hereinabove described is that stagnation points within the flow path of the extrudate as it progresses through the die are effectively eliminated. The elimination of stagnation points is important because it can decrease the total pressure drop across the die for a given extrudate flow rate. In theory, the pressure at any point of stagnation in a fluid flow path is infinite, and although each stagnation point may be infinitesimally small, the combined effects of thousands of such points can generate significant back pressure against the direction of extrudate flow in a typical honeycomb extrusion die.

Further, the elimination of stagnation points means that the material to be extruded is never permitted to stop flowing at any point within the die. Stagnation points in honeycomb extrusion dies generally correspond to high pressure regions within the die, with the pressure in those regions potentially acting to alter the composition of the extrudate, for example by locally squeezing out water, lubricants, or the like. Particles or agglomerates of thus-altered material can break loose from stagnation points, and once free can plug the die and/or create localized inconsistencies in the properties of the extrudate. The results are poor die performance and, ultimately, poor product consistency.

As a consequence of these design advantages, the invention further provides an improved method for manufacturing honeycombs from a variety of extrudable materials. The method of the invention is characterized in that it yields high extruded product quality and consistency even at significantly greater extrusion rates than previously practicable, due to the relatively low pressure drops developed across the extrusion dies in the course of the extrusion process.

Broadly described, the method of making a honeycomb article from an extrudable material in accordance with the invention comprises first delivering an extrudable material into the die body of an extrusion die incorporating enlarged and closely spaced feed channels, thus to form a dense parallel array of feed streams of extrudable material. High feed stream array density is achieved if the die body incorporates a parallel array of polygonal or rounded polygonal feed channels having an aggregate open cross-section in excess of 50% of the area of the die body within which the feed channel array is disposed.

Each of the feed streams thus formed is next conveyed directly and linearly along the feed channels (i.e., without angled or stepwise lateral flow translations) toward a plurality of slot base ends opening into a crisscrossing array of discharge slots disposed in a honeycomb forming section of the die. The absence of angular or lateral flow translations insures minimal channel-induced pressure drops within the feed streams.

As the feed streams exit the feed channels, each feed stream is next divided by flow over and past an array of inverted conical or pyramidal flow dividers. These flow dividers, having apexes extending upstream toward the feed channels and having inclined flow-guiding surfaces extending downstream toward and terminating at the slot base ends, result in the feed stream being divided and guided over the flow-guiding surfaces and into the slot base ends and discharge slots with minimal pressure drop. This occurs without flow stagnation and thus with minimal pressure drop increases associated with stagnant flow zones within the extrusion die.

Finally, the thus-guided feed streams are knitted into an integral honeycomb structure within the discharge slots in the honeycomb forming section, and the resulting structure is extruded from the die outlet surface of the die. In general the pressures required for extrudate knitting and honeycomb discharge do not exceed, and may be less than, those forming pressures encountered in conventional extrusion dies. This is due to the close spacing of the feed channels and the resulting relatively reduced lateral flow distances required for honeycomb knitting of the divided feed streams.

DESCRIPTION OF THE DRAWINGS

The invention is further described below with reference to the appended drawings, wherein:

FIG. 1 is a perspective bottom plan view of a section of a honeycomb forming plate for a die of the invention;

FIG. 2 is a perspective top plan view of the forming plate section of FIG. 1;

FIG. 3 is a cross-sectional side view of portion of an extrusion die of the invention;

FIG. 4 is a perspective view of a cavity plate for an extrusion die of the invention;

DETAILED DESCRIPTION

Figure 5:
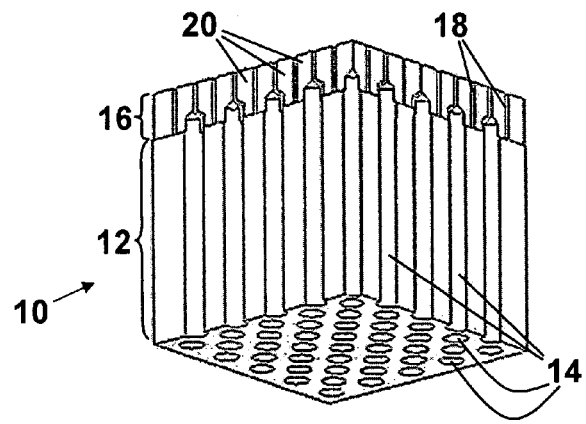
FIG. 5 is a perspective view of a honeycomb extrusion die of the prior art.
Figure 6:
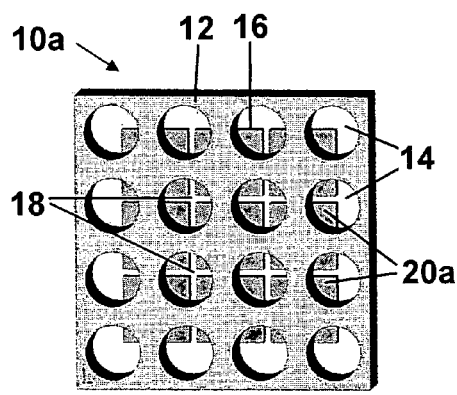
FIG. 6 is a bottom sectional view of a prior art honeycomb extrusion die.

Design features typical of prior art honeycomb extrusion dies are illustrated in FIGS. 5 and 6 of the drawings. FIG. 5 provides a schematic perspective view of a section 10 of a typical prior art honeycomb extrusion die of the type commonly used in the manufacture of ceramic honeycombs. Such dies normally include a die body 12 featuring an array of circular feedholes 14 and a die discharge section 16 comprising a criss-crossing array of discharge slots 18.

Feedholes 14 in such dies are generally free of obstructions and therefore deliver a plasticized extrudate such as a plasticized ceramic powder batch toward die discharge section 16 with minimized pressure drop. Being generally smooth-walled, the interiors of the feedholes 14 do not harbor extrudate flow stagnation points. However, as plasticized extrudate transitions from circular feedholes 14 into a criss-crossing array of discharge slots 18 in die discharge section 16, the circular extrudate streams are reshaped as they are forced around and past an array of pins 20 bounded by discharge slots 18, those pins forming the honeycomb channels of the extrudate.

FIG. 6 of the drawings is a bottom sectional view of a conventional die segment 10a that is similar in design to the die section shown in FIG. 5, and wherein the transition region between feedholes 14 and discharge slots 18 is more clearly shown. As indicated in FIG. 6, the transition region includes pin bases 20a that extend into the cross-sections of feedholes 14. These pin bases present flow constrictions that can readily cause flow stagnation within the transition section of the die.

It is conventional to reduce somewhat the amount of flow stagnation occurring at the feedhole-discharge slot transition points in die of this type. Generally, this involves rounding pin bases 20a so that they do not present surfaces directly transverse to the direction of extrudate flow through the die. However, in most cases at least some transverse surface area remains at the bases of the pins that can capture extrudate, or reduce extrudate flow sufficiently to create "virtual" stagnation points within the die. Further, most known methods for smoothing the feedhole-discharge slot transition remove material from the pin base region, thereby weakening the points of attachment of the pins to the body of the die.

In accordance with the invention these problems are addressed through the adoption of honeycomb extrusion dies of so-called "forcing cone" design. These are designs wherein internal die surfaces transverse to the direction of extrudate flow are substantially eliminated, and without compromising pin strength or durability.

One preferred design for such a die is a two-part design such as schematically illustrated in FIGS. 1–4 of the drawings. In the two-part designs of FIGS. 1–4, the conventional die body that provides strength and rigidity in conventional extrusion dies is replaced with a cavity plate such as cavity plate 40 shown in FIGS. 3 and 4. Traversing the cavity plate in the direction of extrudate flow through the die are a plurality of parallel extrudate feed channels 42, these being formed by drilling or, more commonly, by a combination of drilling and wire electrical discharge machining, the latter being especially useful to shape the feed channels to increase channel cross-section and attain maximum extrudate flow consistent with acceptable plate rigidity. For best flow, feed channels of polygonal or rounded polygonal cross-sectional shape are normally preferred, with square, triangular, and hexagonal channels being examples of space-filling polygons permitting close channel spacing. Since the feed channels are generally large and smooth-walled, cavity plates of substantial thickness can be used without unacceptably increasing extrudate back-pressures.

Replacing the conventional die discharge section in a two-part die design such as described is honeycomb forming plate 30, shown in enlarged views in FIGS. 1–3 of the drawings. Referring more particularly to FIGS. 1–3, honeycomb forming plate 30 includes an outlet face 32 incorporating a criss-crossing array of open-ended discharge slots 34 extending from outlet face 32 toward intersecting slot base ends 34a disposed within the plate. The criss-crossing discharge slots define an array of channel-forming pins 33a terminating at die outlet face 32. The plate surface opposite the outlet face 32 provides an attachment face 38 for joining the honeycomb forming plate 30 to cavity plate 40 at a bonding surface 44 thereof, as shown in FIG. 4.

Honeycomb forming plate 30 includes an array of extrudate transfer openings 31 extending inwardly from attachment face 38, those openings providing paths for extrudate flow from extrudate feed channels 42 in the cavity plate toward the slot base ends 34a, and from there into discharge slots 34. As shown in FIG. 3, the extrudate transfer openings 31 are desirably positionally aligned with and substantially equivalent in cross-sectional size and shape to extrudate feed channels 42, to preclude the possibility of extrudate flow stagnation at the interface between attachment face 38 and bonding surface 44.

Within each of the extrudate transfer openings 31 are extrudate distribution means for dividing and guiding the extrudate stream from associated feed channel 42 into slot base ends 34a. In FIGS. 1–3 these distribution means comprise one or more inverted pyramidal flow dividers 33 comprising the downward extensions or bases of pins 33a, each of which dividers includes inclined flow-guiding surfaces 35 having base edges terminating at base ends 34a of discharge slots 34 and being inclined toward extrudate transfer opening 31 and feed channel 42. The thus-inclined surfaces are effective to eliminate flow stagnation points within honeycomb forming plate 30.

Although four-sided pyramidal dividers are shown in the drawing, three-sided or six-sided pyramidal dividers may be preferred for the production of honeycombs of triangular or hexagonal channel shapes, respectively, and conical flow dividers can be adapted for this use as well. Further, it is not critical that the conical or pyramidal flow dividers comprise sharply-defined apexes; flow dividers with rounded or blunted apexes that nevertheless include inclined flow-guiding surfaces connecting with the slot base ends are included within the definition of pyramidal or conical shapes for the purposes of the present description, and may alternatively and equivalently be used.

Importantly, in the preferred embodiment of FIGS. 1–4 of the drawings, each feed channel 42 is configured to supply extrudate flow linearly to multiple adjacent intersections of slot base ends 34a, i.e., to sixteen such intersections in the design shown in FIGS. 1–3. The relative size and slot coverage of a representative feed channel 42 is indicated by projection line 42a of feed channel 42 onto die outlet face 32 in FIG. 2 of the drawings.

Limited direct or linear flow of extrudate from feedholes to discharge slot intersections is enabled in some prior art die designs, for example as indicated by the open sight line through feedholes 14 to the intersections of slots 18 in the prior art die design of FIG. 6 of the drawings. The use of straight feed channels that preserve linear extrudate flowpaths, rather than angled or branched feed channels as in other prior art die designs, significantly reduces extrudate back-pressure within honeycomb extrusion dies. However, as indicated for the typical design of FIG. 6, prior art feedholes typically preserve linear extrudate flow into only a single slot segment or intersection. In contrast, as shown in FIG. 3 of the drawings, each feed channel 42 of an extrusion die according to the invention encompasses multiple linear flowpaths 36 into multiple slot base segments or intersections 34a of the extrusion die. This significantly reduces extrudate pressure drop across the die.

The shape of feed channels 42 in the cavity plate necessarily impacts the extent to which straight flow toward discharge slot segments or intersections can be achieved. In preferred embodiments of the invention these feed channels are of polygonal or rounded polygonal cross section, since such configurations permit closer feed channel spacing and can secure linear extrudate flow into more slot intersections per feed channel. Most preferably the aggregate or combined cross-sectional area of the feed channels will be in excess of 50% of the area of the channeled section of the cavity plate. In typical honeycomb dies incorporating only conventionally drilled circular feedholes, the combined feedhole cross-sectional area is generally less than 40% of the drilled cross-sectional area of the die body, particularly where the feedholes are provided only on alternate slot intersections.

To further support and stiffen the honeycomb forming plates it can be useful to include strength-enhancing cross-web members within the extrudate transfer openings. As illustrated by members 39 in FIG. 1 of the drawings, such members can additionally space and support adjacent flow dividers, and can themselves include flow-guiding surfaces inclined toward the extrudate transfer openings 31 and feed channels 42 to prevent extrudate flow stagnation.

As is apparent from a study of the large-feed-channel designs of FIGS. 1–3 of the drawings, these dies can include one or a plurality of flow dividers 33 and connected channel-forming pins 33a within each transfer opening 31 or feed channel 42 that are spaced away from the sidewalls of the transfer openings or feed channels, and that are therefore without any direct connection to the die body section. Thus, unlike all of the pins in conventional extrusion die designs, these pins and flow dividers have no base connections to the die body section or cavity plate that would help the flow-dividers and pins resist downstream deflection under the outward forces applied thereto by the pressure of the flowing extrudate.

For support purposes, therefore, these otherwise unsupported flow dividers and pins are connected to and supported from adjacent flow dividers and pins by one or more lateral connectors 37. Most preferably connectors 37 will bridge opposing inclined flow-guiding surfaces 35 of adjacent flow dividers, as best shown in FIGS. 1 and 3 of the drawings, leaving the down-stream slots free of obstruction. Further, the connectors themselves will preferably have inclined flow-guiding surfaces that are inclined toward the extrudate transfer openings 31 and feed channels 42, thus being free of surface regions disposed transversely to the direction of extrudate flow through the die.

The method used to fabricate an extrusion die in accordance with the invention is not critical. Rapid prototyping methods involving the formation of complex structures by the layering and fusion of metal or ceramic powders are applicable, as are "lost wax" or investment casting methods for shaping tough and strong parts of complex configuration. In fact the use of these particular methods may, as a practical matter, be necessary for one-piece die constructions since the die body and die forming section are formed as an integral unit and it is difficult or impossible to form such structures by the traditional drilling and slotting methods used for the construction of conventional honeycomb extrusion dies.

On the other hand, more conventional machining methods are very effective for the construction of two-part extrusion dies in accordance with the invention, such methods including mechanical or electrochemical drilling and wire or electrode electrical discharge machining as particular examples. The use of such traditional methods to form an extrusion die of two-part design in accordance with the invention is illustrated in the following example, which is intended to be illustrative rather than limiting.

EXAMPLE 1

Honeycomb Die Construction

A 5 cm-thick billet of solid tool steel is selected for use as a cavity plate in a two-part honeycomb extrusion die. In order to provide extrudate feed channels in the plate, an array of pilot holes of approximately 3 mm diameter is first drilled through the billet using mechanical drilling. Thereafter the array of pilot holes is converted to a close-packed array of feed channels of rounded polygonal (square) cross-section by inserting a wire through each pilot hole and routing out each feed channel by wire electrical discharge machining (EDM). The feed channels thus provided are rounded square holes approximately 4.285 mm on a side at a center-to-center channel spacing of about 5 mm.

Figure 7:
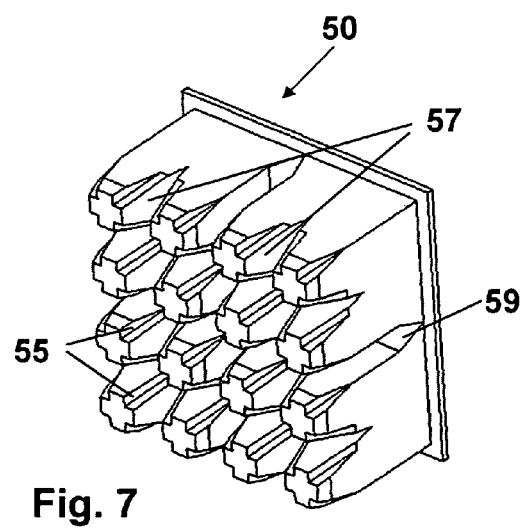
FIG. 7 is a forming tool useful for producing a die forming plate such as illustrated in FIG. 1.

A 2.5 cm-thick billet of tool steel is selected for use to fabricate a honeycomb forming plate for the two-part die. Extrudate transfer openings are first formed in one surface of this plate by plunge electrical discharge machining (EDM). An EDM electrode suitable for plunging a packed array of four transfer openings separated by cross-web members in a single pass, producing an array as shown in FIG. 1 of the drawings, is illustrated in FIG. 7 of the drawings. Among other elements, EDM electrode 50 includes surface features 55 suitable for forming the inclined, flow-guiding surfaces 35 of pyramidal flow dividers 33 (FIG. 1), as well as recesses 59 for forming strengthening cross-web members 39, and recesses 57 for forming connectors 37 for spacing and supporting adjacent flow divider surfaces. Multiple plunges to a depth of approximately 2.5 mm are conducted with this tool, with the spacing between the plunged openings being fixed to correspond to the spacing between the feed channels in the cavity plate.

Following the machining of the honeycomb forming plate, the cavity plate is bonded to the plunged surface of the forming plate with the feed channels of the cavity plate being accurately aligned with the groups of four transfer openings in the forming plate. A conventional metal diffusion bonding process is used to form a permanent bond between the two plates.

Following bonding, excess thickness is cut from the top surface of the bonded assembly constituting the exposed surface of the forming plate by wire EDM machining, thus to establish a die outlet face for the assembly. Thereafter a criss-crossing array of discharge slots is cut into the die outlet face by wire EDM slitting, the slots being cut to a depth sufficient to open the slot bases into the tops of the transfer openings previously machined into the bonded surface of the forming plate. Thus paths for the direct flow of extrudate into and through the discharge slots from the array of feed channels in the cavity plate are provided.

A two-part honeycomb die made substantially as described is used for the extrusion of honeycomb shapes from a plasticized ceramic powder batch of clay talc and alumina. The die produces well-formed honeycomb structures of 64 channels/cm$^2$ cell density and 0.1 mm wall thickness. The extrusion pressures required for these extrusions are approximately 25–50% below those required for the production of similar honeycombs through conventional honeycomb extrusion dies.

Of course, the specific embodiments and examples of extrusion die designs and methods hereinabove described are merely illustrative of the invention as it may be adapted with suitable variations to support improved honeycomb extrusion processing within the scope of the appended claims.

I claim:

1. A honeycomb extrusion die comprising:
   a die body section having a die inlet face and a parallel array of open-ended extrudate feed channels extending from the inlet face toward a honeycomb forming section, the honeycomb forming section being spaced from the inlet face and terminating at a die outlet face;
   the die outlet face incorporating a criss-crossing array of open discharge slots extending inwardly into the honeycomb forming section toward the feed channels, said slots terminating at slot base ends disposed within the honeycomb forming section and defining an array of channel-forming pins terminating at the die outlet face;
   extrudate distribution means disposed within each of the extrudate feed channels for guiding extrudable material toward the slot base ends, said distribution means comprising one or more inverted conical or pyramidal flow dividers with apexes extending inwardly from the pins toward the feed channels, the flow dividers including flow-guiding surfaces inclined toward the feed channels that have base edges terminating at the base ends of the discharge slots;
   the average cross-sectional area of the extrudate feed channels being in excess of twice the average cross-sectional area of the channel-forming pins defined by the discharge slots.

2. A honeycomb extrusion die in accordance with claim 1 wherein the extrudate feed channels are of polygonal or rounded polygonal cross-sectional shape.

3. A honeycomb extrusion die in accordance with claim 1 wherein the aggregate feed channel cross-sectional area is in excess of 50% of the cross-sectional area of the channeled portion of the die body section.

4. A honeycomb extrusion die in accordance with claim 1 that includes a plurality of flow dividers and connected pins having no base connections to the die body section.

5. A honeycomb extrusion die in accordance with claim 4 wherein the flow dividers having no base connections to the die body section are connected to and spaced from adjacent flow dividers by one or more lateral connectors.

6. A honeycomb extrusion die in accordance with claim 1 which is a two-part die comprising (i) a die body section formed of a cavity plate incorporating extrudate feed channels and a die inlet face, and (ii) a honeycomb forming section comprising a honeycomb forming plate incorporating conical or pyramidal flow dividers, open discharge slots, and a die outlet face.

7. A honeycomb extrusion die in accordance with claim 6 wherein the cavity plate includes a bonding surface opposite the die inlet face and wherein honeycomb forming plate includes an attachment face connected to the bonding surface and an array of extrudate transfer openings extending into the honeycomb forming plate from the attachment face toward the slot base ends, the extrudate transfer openings being positionally aligned with and substantially matching the extrudate feed channels in size and shape.

* * * * *